United States Patent
Yamamoto et al.

(10) Patent No.: US 7,619,358 B2
(45) Date of Patent: Nov. 17, 2009

(54) DISPERSION-TYPE EL DEVICE AND ILLUMINATED SWITCH UNIT USING THE SAME

(75) Inventors: Tamotsu Yamamoto, Ashiya (JP); Masaki Sawada, Suita (JP); Koji Tanabe, Katano (JP)

(73) Assignee: Panasonic Corp., Osaka (JP)

( * ) Notice: Subject to any disclaimer, the term of this patent is extended or adjusted under 35 U.S.C. 154(b) by 536 days.

(21) Appl. No.: 11/192,292

(22) Filed: Jul. 28, 2005

(65) Prior Publication Data

US 2006/0038487 A1     Feb. 23, 2006

(30) Foreign Application Priority Data

Aug. 20, 2004   (JP)   ............... 2004-240472

(51) Int. Cl.
*H01J 33/04*   (2006.01)
(52) U.S. Cl. ...................... 313/509; 313/506
(58) Field of Classification Search ......... 313/498–512; 428/690
See application file for complete search history.

(56) References Cited

U.S. PATENT DOCUMENTS

| | | |
|---|---|---|
| 5,871,088 A | 2/1999 | Tanabe |
| 6,936,960 B2 * | 8/2005 | Cok ............................ 313/506 |
| 7,106,290 B2 * | 9/2006 | Inukai et al. .................. 345/92 |
| 2003/0146693 A1 * | 8/2003 | Ishihara et al. .............. 313/504 |
| 2004/0115859 A1 | 6/2004 | Murayama et al. |

FOREIGN PATENT DOCUMENTS

| | | |
|---|---|---|
| CN | 1179854 A | 4/1998 |
| CN | 1498047 A | 5/2004 |
| JP | 10-106754 | 4/1998 |
| JP | 2002-50469 A | 2/2002 |
| JP | 2004-55440 A | 2/2004 |

* cited by examiner

*Primary Examiner*—Nimeshkumar D. Patel
*Assistant Examiner*—Anne M Hines
(74) *Attorney, Agent, or Firm*—RatnerPrestia

(57) ABSTRACT

A dispersion-type EL device includes a short-bar contact, a first insulating layer, a back electrode layer, a dielectric layer, a luminescent layer, and an optically transparent electrode layer, which are sequentially formed on a temporary substrate that has been processed with an exfoliation treatment. This configuration realizes a reduction in size in a thickness direction. Furthermore, an illuminated switch unit is provided, in which a dispersion-type EL device peeled off from a temporary substrate and a wiring board having a comb-like contact are connected to each other.

5 Claims, 14 Drawing Sheets

DISPERSION-TYPE EL DEVICE AND ILLUMINATED SWITCH UNIT USING THE SAME

BACKGROUND OF THE INVENTION

1. Field of the Invention

The present invention relates to a dispersion-type EL device used for an input unit etc. of various types of electronic equipment and an illuminated switch unit using the same.

2. Background Art

Hereinafter, a conventional dispersion-type EL device (hereinafter referred to as "EL device") and an illuminated switch unit (hereinafter referred to as "switch unit") using the same are described with reference to FIGS. 13 and 14.

FIG. 13 is a sectional view showing a conventional EL device. EL device 101 includes insulating substrate 102, transparent electrode layer 103, luminescent layer 104, dielectric layer 105, back electrode layer 106, and insulating layer 107. Insulating substrate 102 is made of a transparent resin film having a thickness of about 100 μm. On the back surface of insulating substrate 102, transparent electrode layer 103 is formed by a thin film formation technique such as a sputtering method. On transparent electrode layer 103, luminescent layer 104, dielectric layer 105, back electrode layer 106, and insulating layer 107 are sequentially laminated. Note here that the dimensions in the thickness direction in FIGS. 13 and 14 are enlarged relative to scale.

In EL device 101, when ac voltage or dc pulse voltage is applied between transparent electrode layer 103 and back electrode layer 106 by a driver circuit (not shown), a fluorescent substance in luminescent layer 104 emits light. Light emitted from luminescent layer 104 passes through the side of insulating substrate 102 that is a light-emitting surface side of EL device 101, and is illuminated.

FIG. 14 is a sectional view showing a conventional switch unit using EL device 101.

As shown in FIG. 14, switch unit 108 has membrane switch portion 114. Membrane switch portion 114 has a configuration in which spacer 113 is adhesively attached between upper insulating plate 109 (hereinafter referred to as "plate 109") and lower insulating plate 111 (hereinafter referred to as "plate 111"). Plate 109 is made of a resin film having a thickness of about 100 μm. Movable contact 110 (hereinafter referred to as "contact 110") is printed on the lower surface of plate 109. Plate 111 is made of a resin film. Stationary contact 112 (hereinafter referred to as "contact 112") is printed on the upper surface of plate 111. Spacer 113 is adhesively attached between plate 109 and plate 111 so that contact 110 and contact 112 face each other with predetermined space therebetween. Contacts 110 and 112, which face each other, constitute switch portion 119.

EL device 101 including insulating substrate 102 having a driver circuit that is independent from that of membrane switch portion 114, is located on membrane switch portion 114. EL device 101 has a total thickness of about 0.3 mm. Furthermore, in an upper part of EL device 101, spacer 118 and surface sheet 117 are sequentially disposed. Push buttons 115, which are located above individual switch portions 119, are attached to a lower surface of surface sheet 117 with adhesive member 116. A lower end portion of push button 115 is brought into contact with EL device 101. Thus, switch unit 108 is configured.

Push button 115 is depressed by applying pressure (for example, with a finger, a pen, etc.) through surface sheet 117. When push button 115 presses EL device 101, the pressed portion of EL device 101 is partially flexed and plate 109 disposed at a lower side of EL device 101 is also partially flexed. Thus, contact 110 is depressed, so that a lower surface of contact 110 is brought into contact with an upper surface of contact 112. Then, contact 110 and contact 112 are electrically connected to each other, and switch portion 119 is turned on.

When the operated power to surface sheet 117 is removed, plate 109 and EL device 101 return to the original states by their own restoring forces, so that switch portion 119 is turned off again as shown in FIG. 14.

Note here that devices similar to EL device 101 and switch unit 108 are disclosed in, for example, Japanese Patent Unexamined Publication No. H10-106754.

SUMMARY OF THE INVENTION

A dispersion-type EL device includes a short-bar contact, a first insulating layer, a back electrode layer, a dielectric layer, a luminescent layer, and an optically transparent electrode layer, which are sequentially formed on a temporary substrate that has been processed with an exfoliation treatment. This configuration realizes a reduction in size in a thickness direction.

Furthermore, in an illuminated switch unit using this dispersion-type EL device, an EL device peeled off from a temporary substrate and a wiring board having a comb-like contact are connected to each other.

DETAILED DESCRIPTION OF THE INVENTION

Hereinafter, embodiments of the present invention are described with reference to FIGS. 1 to 12.

FIRST EMBODIMENT

Figure 1:
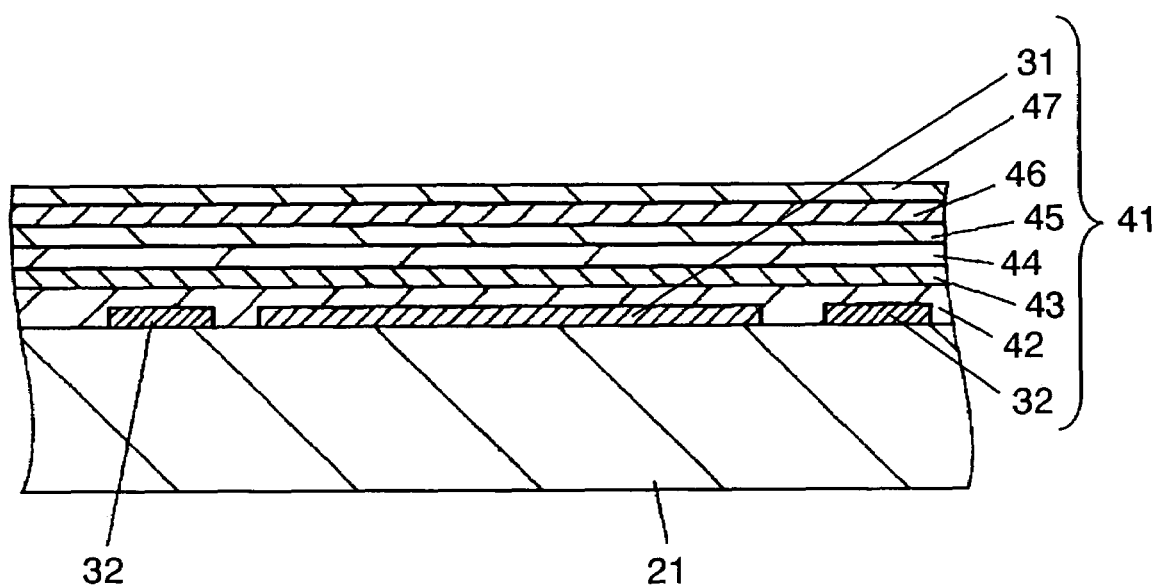
FIG. 1 is a sectional view showing a dispersion-type EL device according to a first embodiment of the present invention.
Figure 2:
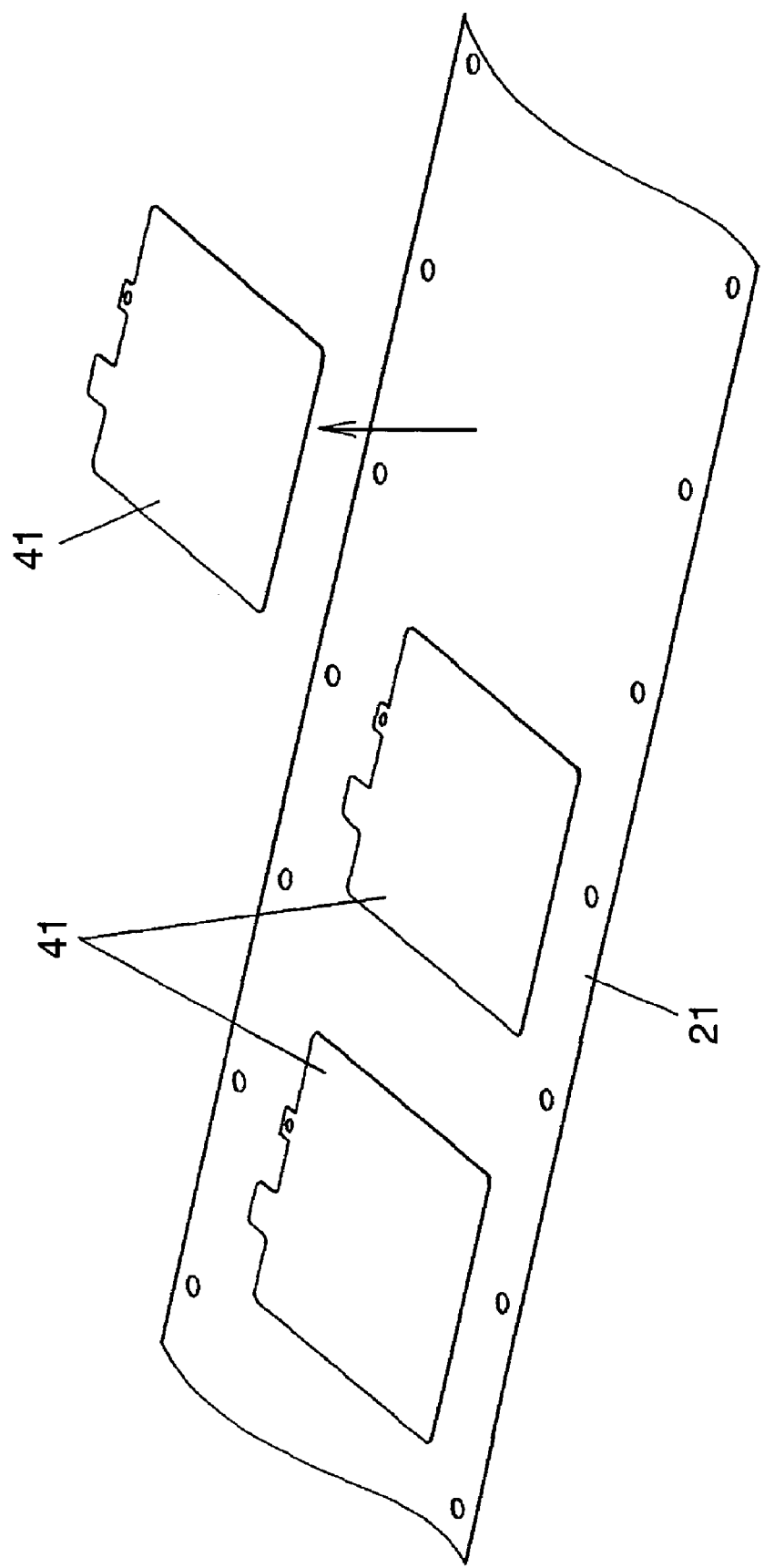
FIG. 2 is a perspective view of the dispersion-type EL device shown in FIG. 1.
Figure 3:
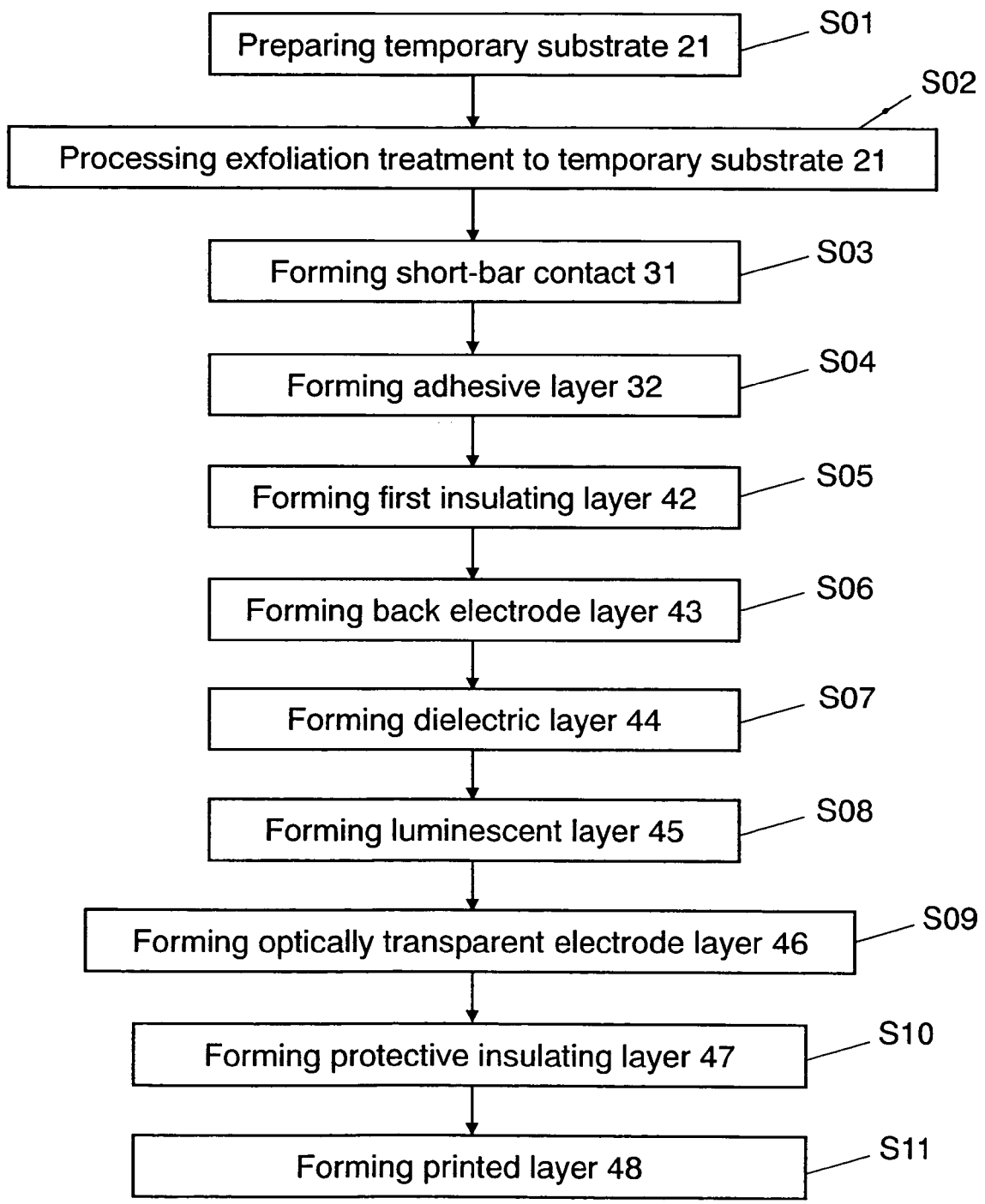
FIG. 3 is a flowchart showing a method for manufacturing the dispersion-type EL device shown in FIG. 1.

FIG. 1 is a sectional view showing a dispersion-type EL device (hereinafter referred to as "EL device") according to a first embodiment of the present invention. FIG. 2 is a perspective view showing a state in which EL devices shown in FIG. 1 are disposed on a temporary substrate with a predetermined pitch. FIG. 3 is a flowchart showing a method for manufacturing the dispersion-type EL device shown in FIG. 1. Note here that the dimension in the thickness direction in each sectional view is shown enlarged relative to scale.

In FIGS. 1 and 2, temporary substrate 21 is made of PET (polyethylene terephthalate) etc. and has a hoop shape. The surface of temporary substrate 21 has been processed with an exfoliation treatment for improving peeling characteristics of the surface. EL devices 41 are formed with a predetermined pitch on the upper surface side of temporary substrate 21 in the longitudinal direction of hoop-shaped temporary substrate 21. Functional layers constituting EL device 41 are respectively superimposed by, for example, screen printing, etc.

A method for manufacturing EL device 41 is described with reference to FIG. 3.

First, temporary substrate 21 is prepared (step S01) and the surface of temporary substrate 21 is processed with an exfoliation treatment (step S02). Short-bar contact 31 (hereinafter referred to as "contact 31") having a predetermined shape is formed on the upper surface of temporary substrate 21 that has been processed with an exfoliation treatment (step S03). Contact 31 is printed by using a conductive material such as a conductive paste. Then, around contact 31, ring-shaped adhesive layer 32 is printed with a predetermined space from the outer periphery of contact 31 so that adhesive layer 32 surrounds contact 31 (step S04).

Then, first insulating layer 42 (hereinafter referred to as "insulating layer 42") is formed to cover the upper surfaces of contact 31 and adhesive layer 32, respectively (step S05). On the surface of temporary substrate 21 on which contact 31 and adhesive layer 32 are not formed, the surface of temporary substrate 21 is exposed, and therefore, the lower surface of insulating layer 42 is formed directly on the surface of temporary substrate 21.

In addition, back electrode layer 43 is formed on insulating layer 42 (step S06). Furthermore, dielectric layer 44 is formed on back electrode layer 43 (step S07). Luminescent layer 45 is formed on dielectric layer 44 (step S08). Optically transparent electrode layer 46 (hereinafter referred to as "electrode layer 46") is formed on luminescent layer 45 (step S09). Optically transparent protective insulating layer 47 (hereinafter referred to as "insulating layer 47") is formed on electrode layer 46 (step S10). Furthermore, on a portion on which insulating layer 47 is not formed on the surface of electrode layer 46, that is, a portion on which electrode layer 46 is exposed, optically non-transparent printed layer 48 (hereinafter referred to as "printed layer 48") is formed (step S11). Functional layers including contact 31, adhesive layer 32, insulating layer 42, back electrode layer 43, dielectric layer 44, luminescent layer 45, electrode layer 46, insulating layer 47 and printed layer 48 are sequentially laminated, respectively.

Note here that the order of formation of contact 31 and adhesive layer 32 may be reversed. The order of formation of insulating layer 47 and printed layer 48 may be also reversed. Furthermore, steps for forming contact 31, adhesive layer 32, insulating layer 47 and printed layer 48 are not necessarily required.

An illuminating function of EL device 41 is configured by insulating layer 42, back electrode layer 43, dielectric layer 44, luminescent layer 45, electrode layer 46, insulating layer 47 and printed layer 48 which are sequentially printed on temporary substrate 21. In the operation of EL device 41, ac voltage or dc pulse voltage is applied between back electrode layer 43 and electrode layer 46 by a driver circuit (not shown), so that a fluorescent substance dispersed in luminescent layer 45 emits light. Then, light emitted from luminescent layer 45 passes through the side of insulating layer 47 and is illuminated from the outside.

When an illuminated switch unit (hereinafter referred to as "switch unit") etc. is configured by using EL device 41, EL device 41 including contact 31 and adhesive layer 32 is peeled off from temporary substrate 21 in a state in which functional layers are laminated, and used. That is to say, substrate-free EL device 41 without including a substrate is used. Since the upper surface of temporary substrate 21 on which EL device 41 is formed has been processed with an exfoliation treatment, workability when EL device 41 is peeled off from temporary substrate 21 is favorable.

Figure 4:
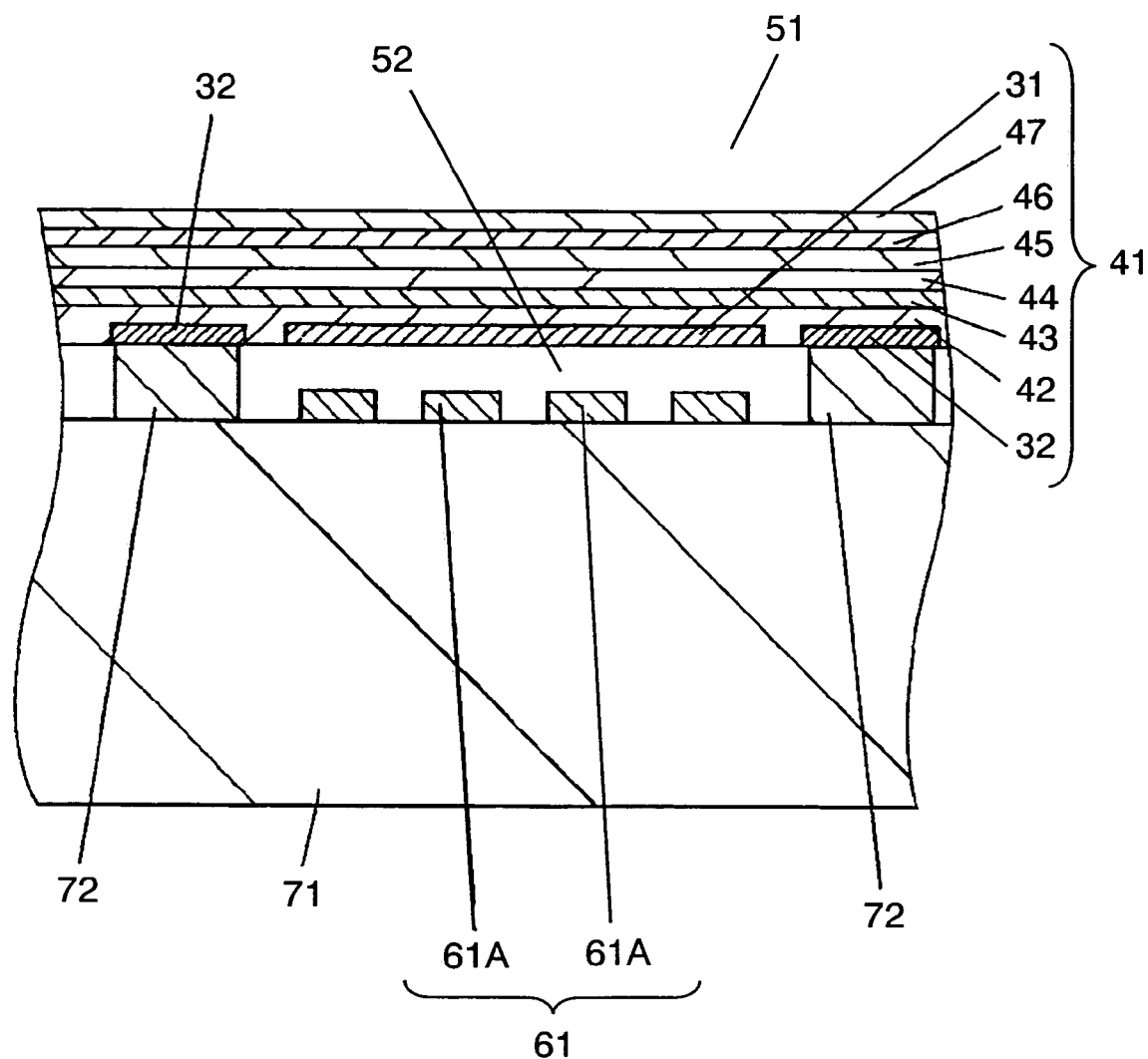
FIG. 4 is a sectional view showing an illuminated switch unit configured by using the dispersion-type EL device shown in FIG. 1.
Figure 5:
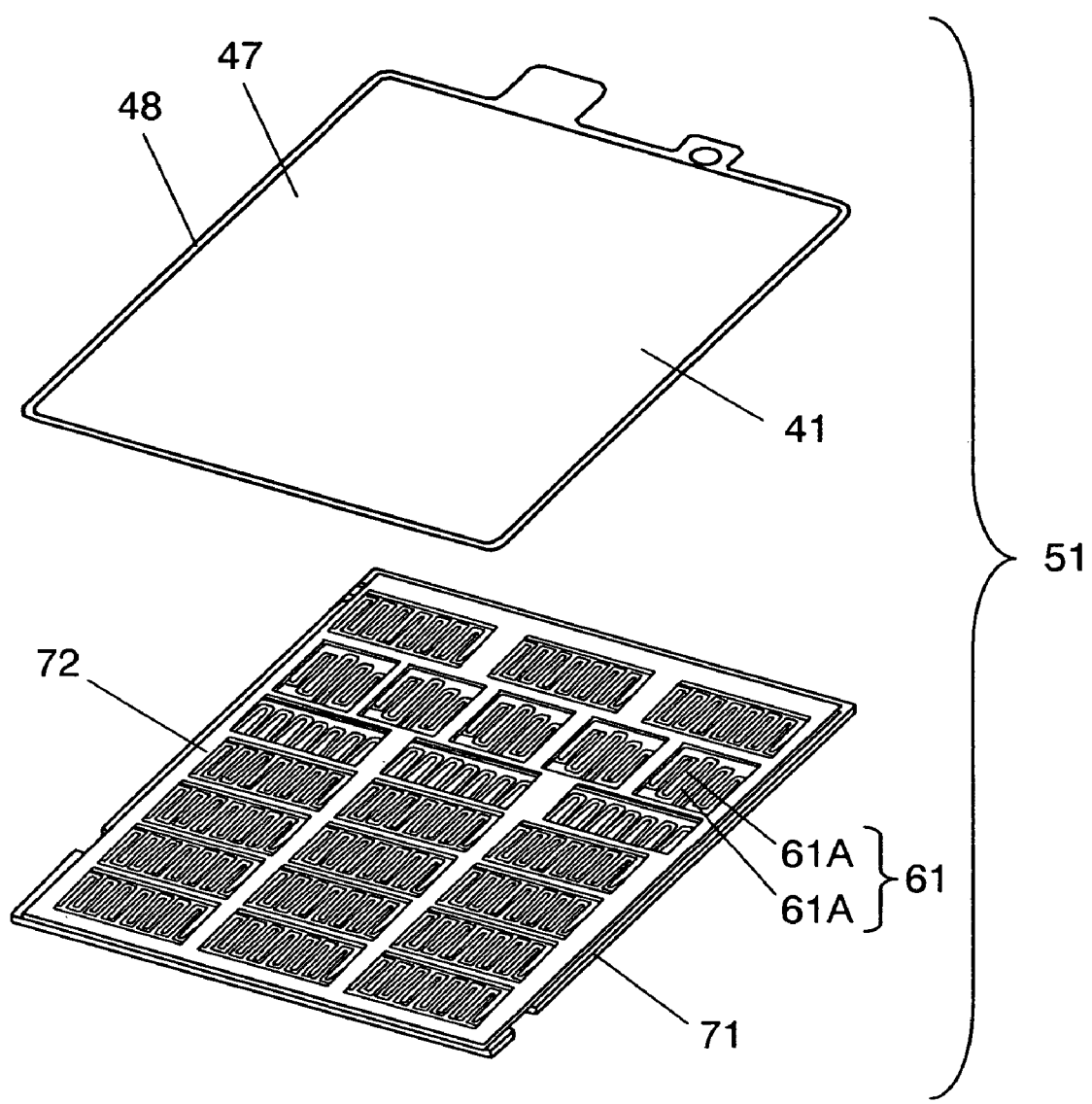
FIG. 5 is an exploded perspective view showing the illuminated switch unit shown in FIG. 4.
Figure 6:
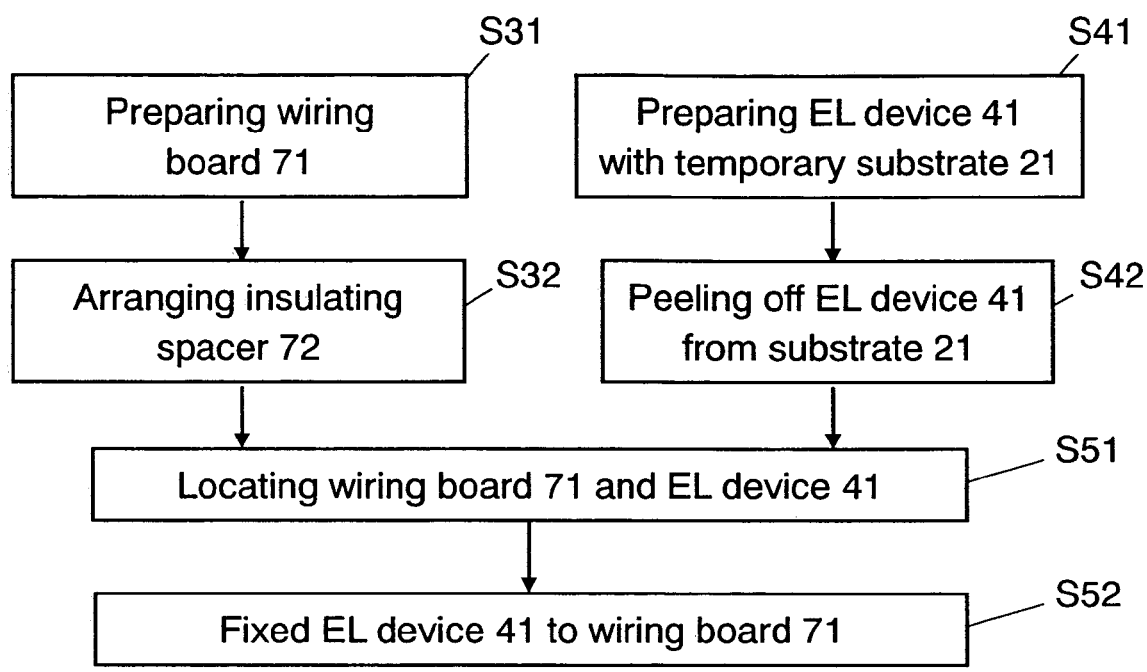
FIG. 6 is a flowchart showing a method for manufacturing the illuminated switch unit shown in FIG. 4.

Next, an illuminated switch unit is described. FIG. 4 is a sectional view showing a switch unit. FIG. 5 is an exploded perspective view showing the switch unit shown in FIG. 4. FIG. 6 is a flowchart showing a method for manufacturing the switch unit shown in FIG. 4.

As shown in FIGS. 4 and 5, switch unit 51 has a configuration in which EL device 41 peeled off from temporary substrate 21 is superimposed on and connected to wiring board 71. EL device 41 and wiring board 71 are connected to each other so that contact 31 faces comb-like contact 61 (hereinafter referred to as "contact 61") formed on the upper surface of wiring board 71. Note here that EL device 41 has a total thickness of about 100 µm which is extremely thinner than that of a conventional EL device.

Next, a method for manufacturing switch unit 51 is described with reference to FIG. 6.

First, wiring board 71 provided with contact 61 is prepared (step S31). Note here that detailed description of a method for manufacturing wiring board 71 is omitted herein. Then, on the surface of wiring board 71, insulating spacer 72 (hereinafter referred to as "spacer 72") is located and arranged (step S32).

On the other hand, according to the flowchart shown in FIG. 3, EL device 41 having temporary substrate 21 is prepared (step S41). EL device 41 is peeled off from temporary substrate 21 (step S42). Then, wiring board 71 on which spacer 72 is disposed and EL device 41 are located (step S51). Located wiring board 71 and EL device 41 are processed with a heat treatment, so that adhesive layer 32, spacer 72 and wiring board 71 are adhered to each other respectively, and EL device 41 and wiring board 71 are connected to each other.

The thus formed switch unit 51 has the following configuration. That is to say, EL device 41 and wiring board 71 are disposed in a state in which contact 31 and contact 61 face each other with predetermined space therebetween in the vertical direction. The lower surface of adhesive layer 32 exposed to the lower surface of EL device 41 is directly attached to spacer 72 disposed on wiring board 71.

Adhesive layer 32 is previously formed in a ring form surrounding the periphery of each contact 31. When EL device 41 is peeled off from temporary substrate 21, adhesive layer 32 is exposed. Then, adhesive layer 32 having adhesiveness is superimposed on wiring board 71. Thus, EL device 41 peeled off from temporary substrate 21 can be easily attached to wiring board 71.

Furthermore, the height of spacer 72 is appropriately set, thereby enabling space between contact 31 and contact 61 to be maintained stably. Thus, stable switch operation can be obtained.

As shown in FIGS. 4 and 5, spacer 72 may be an insulating film having an opening at the portion corresponding to contact 61. Furthermore, an insulating paste etc. (not shown) may be integrated on wiring board 71 or may be formed by screen printing. When spacer 72 is made of an insulating film, it is preferable that the lower surface of spacer 72 is adhesively attached to wiring board 71 in a way in which it surrounds the periphery of contact 61 and that dust resistance property is improved. Spacer 72 itself may have adhesiveness or another adhesive layer (not shown) may be formed between spacer 72 and wiring board 71.

Contact 61 has a configuration in which two or more comb-like portions 61A each of which is extended from independent wiring portion face one contact 31 with space therebetween and in which comb-like portions 61A are arranged electrically independent from each other.

Contact 31 and adhesive layer 32 are covered with temporary substrate 21 before EL device 41 is peeled off from temporary substrate 21. Thus, on the surfaces of contact 31 and adhesive layer 32, there are less undesired attached substances such as dusts. Thus, switch unit 51 provided with individual switch portion 52 having high quality and excellent dust resistance property can be realized.

Furthermore, since contact 31, which is disposed in a state in which it is exposed to the lower surface of insulating layer 42, is configured as one facing contact of individual switch portion 52, switch unit 51 can be made thin.

Next, an operation of switch unit 51 configured as mentioned above is described.

First, when a predetermined voltage is applied between back electrode layer 43 and electrode layer 46, a fluorescent substance contained in luminescent layer 45 emits light. Light emitted from luminescent layer 45 passes through the side of insulating layer 47 and is illuminated from the upper part of switch unit 51. A color of light emitted from switch unit 51 is set to a desirable color depending upon the type of fluorescent substances dispersed in luminescent layer 45, coloring of layers transmitting light such as electrode layer 46 or insulating layer 47.

Figure 7:
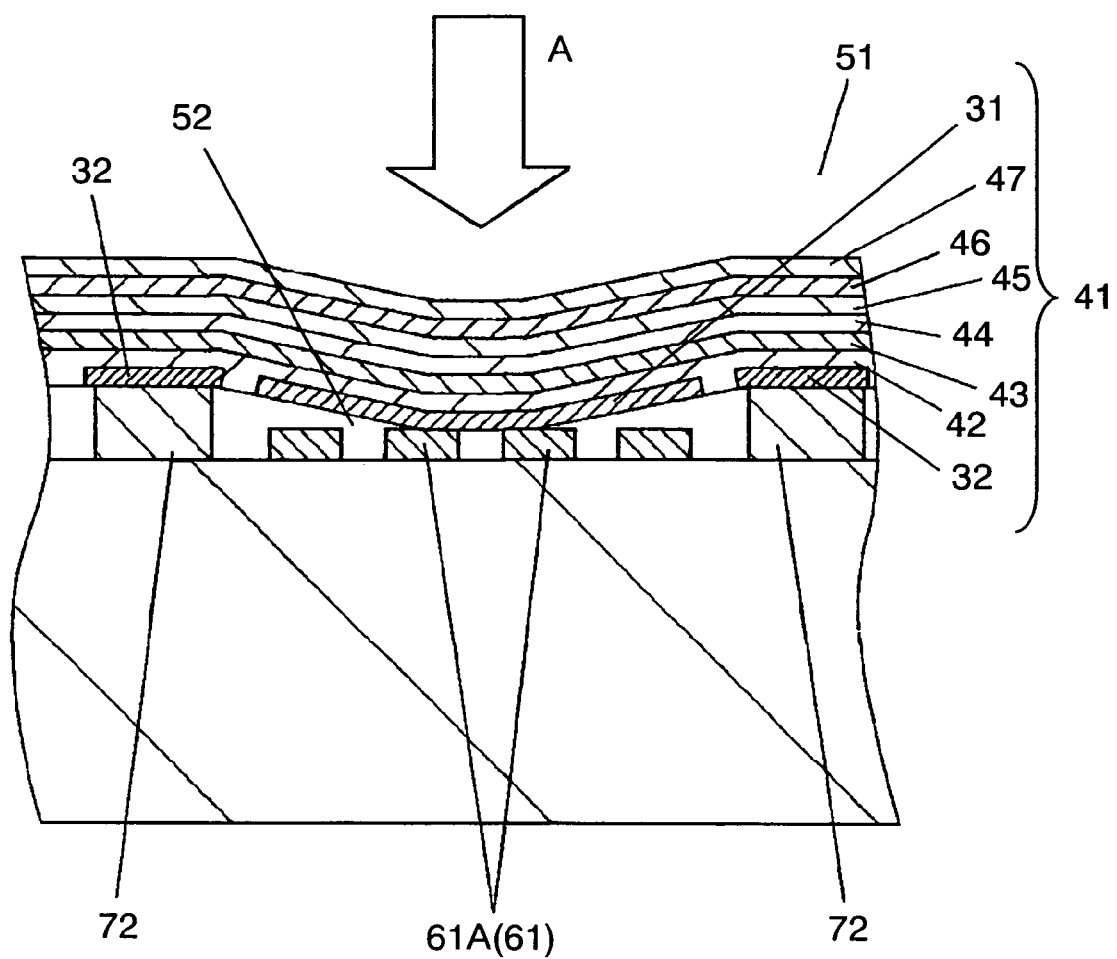
FIG. 7 is a sectional view showing an operation state of the illuminated switch unit shown in FIG. 4.

Next, when insulating layer 47 disposed at the upper part of contact 31 is depressed by a finger, a pen, or the like, from the upper part as shown by an arrow A in FIG. 7, a part of the depressed portion flexes downwardly. Since each layer of EL device 41 is made by screen printing, it contains much resin component. Furthermore, EL device 41 is substrate-free. Thus, EL device 41 has sufficient flexibility, excellent operability and operation feeling. Furthermore, space between the contacts 31 and 61 of individual switch portion 52 is set at a short stroke of about 20 to 100 μm. Therefore, stress applied to each functional layer of EL device 41 can be reduced and damages can be prevented.

In accordance with the depressing operation, contact 31 moves downwardly and is brought into contact with comb-like portions 61A. Thus, comb-like portions 61A, which are electrically independent from each other, are electrically connected, and switch portion 52 is turned on.

Furthermore, when depressing operation power is removed, a flexed portion of EL device 41 returns to the original state by its own restoring force. Thus, contact 31 is separated from comb-like portions 61A, so that comb-like portions 61A return to be electrically independent from each other. Then, switch portion 52 is turned off.

Since insulating layer 47 is disposed on electrode layer 46, at the time of depressing operation, electrode layer 46 is protected by insulating layer 47 and electrode layer 46 is prevented from being damaged. Furthermore, forming insulating layer 47 is possible to obtain an effect of reinforcing the restoring force after the depressing power is removed. Furthermore, when insulating layer 47 is provided with a display function, etc., operability and functionality can be further improved.

As binder resins constituting the functional layers of EL device 41, it is important to select materials capable of obtaining desired EL properties such as luminance and materials capable of obtaining mechanical properties such as durability at the time of switching operation. Furthermore, restorative property after pressing operation is also highly dependent upon characteristics of binder resins. Therefore, by comprehensively considering the above, materials for binder resins are selected.

As mentioned above, switch unit 51 uses thin EL device 41 which has been peeled off from temporary substrate 21 and in which only functional layers are laminated without including a substrate. Furthermore, one contact of facing contacts constituting individual switch portion 52 is disposed on the lower surface of EL device 41. Thus, it is possible to realize thin switch unit 51.

Furthermore, contact 31 and adhesive layer 32 are formed on the upper surface of temporary substrate 21 that has been processed with an exfoliation treatment. Therefore, residual release agent can be left on surfaces of contact 31 and adhesive layer 32 after EL device 41 is peeled off from temporary substrate 21. However, as surface states with contact 31 and adhesive layer 32, excellent states with no exfoliation dusts attached can be maintained. Thus, thin and high quality switch portion 52 can be obtained easily.

Furthermore, after EL device 41 is peeled off from temporary substrate 21, contact 31 and adhesive layer 32 have the surface configurations transferred from the surface configuration of temporary substrate 21. Therefore, by selecting the surface configuration of temporary substrate 21 appropriately, the surface configurations of contact 31 and adhesive layer 32 are controlled well. Thus, an adhesive condition of connecting EL device 41 and wiring board 71 is controlled well.

A method including a step of processing exfoliation treatment to temporary substrate 21 before contact 31 is formed was described. However, the exfoliation treatment is not necessarily carried out immediately before forming contact 31. For example, when temporary substrate 21 is made of a material such as fluororesin having high peeling characteristics, a specific exfoliation treatment is not necessarily required. Therefore, the use of materials having high peeling characteristics is encompassed in the exfoliation treatment.

Figure 8:
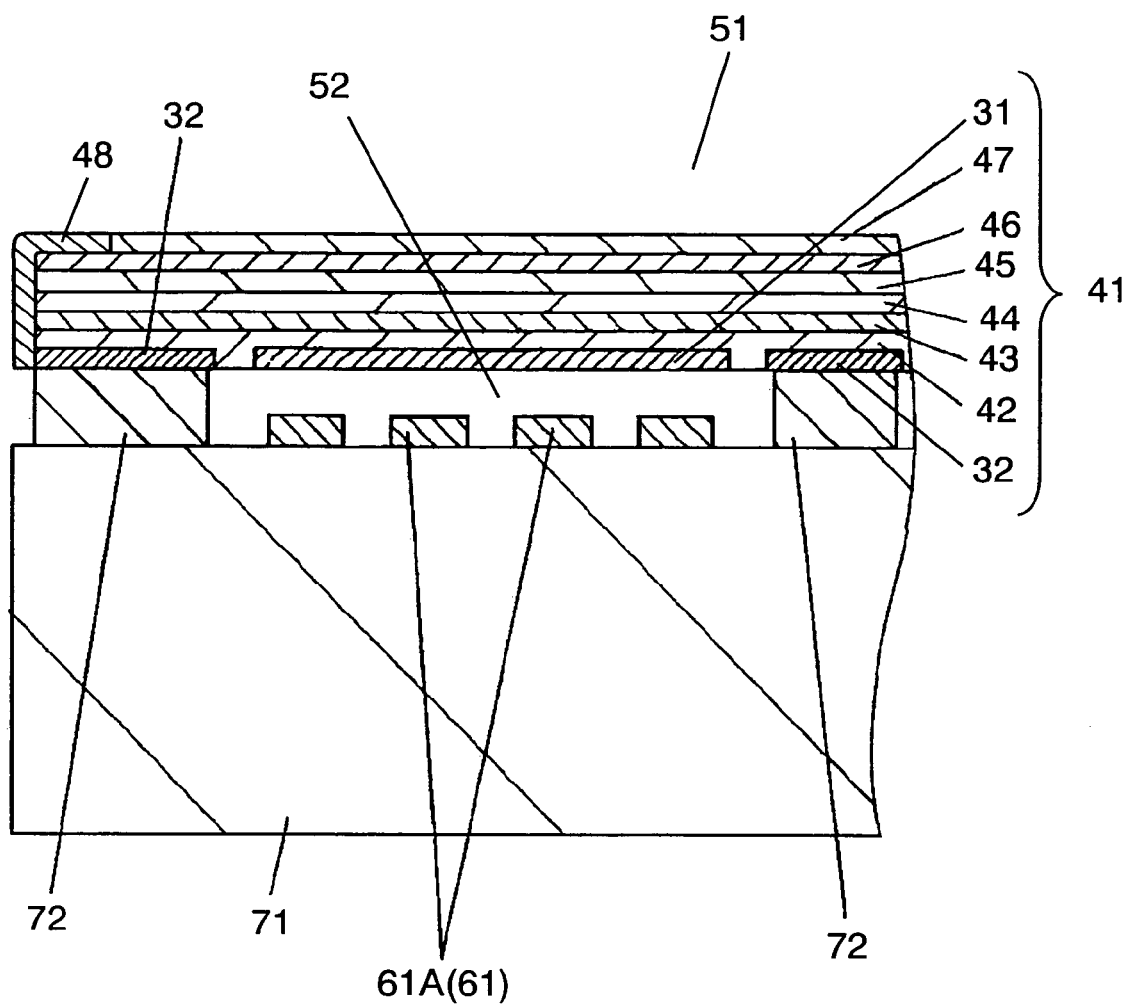
FIG. 8 is a sectional view showing another section of the illuminated switch unit shown in FIG. 4.
Figure 9:
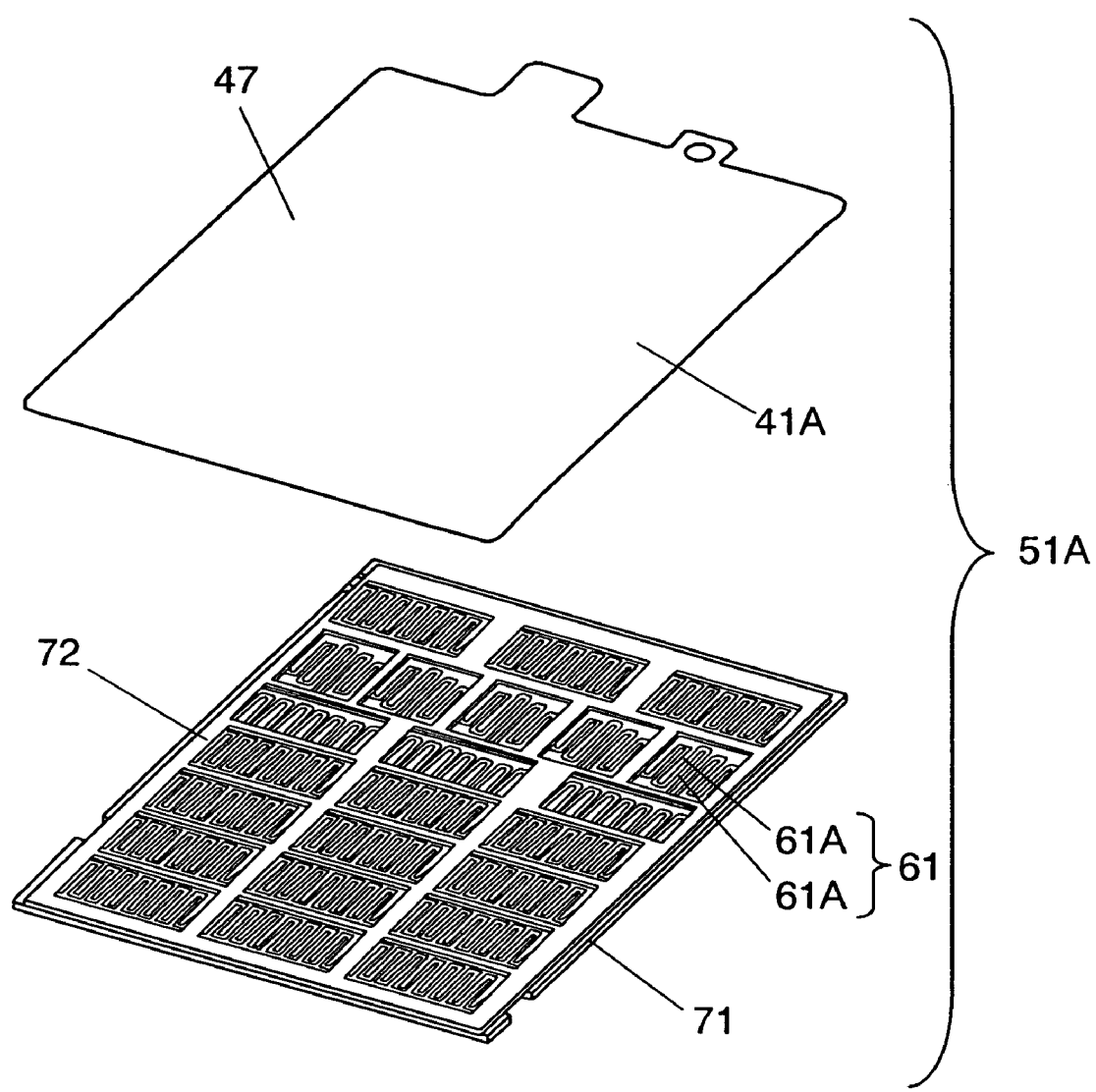
FIG. 9 is an exploded perspective view showing an illuminated switch unit according to another embodiment.

As shown in FIGS. 5 and 8, the central portion of the surface of electrode layer 46 is covered with optically transparent insulating layer 47 and the peripheral portion is covered with optically non-transparent printed layer 48. Thus, by covering the surface of EL device 41 with a layer capable of transmitting light and a layer that does not transmit light, switch unit 51 has a configuration in which only a desirable region can be illuminated. Note here that printed layer 48 is not necessarily required. As shown in FIG. 9, switch unit 51A may have a configuration in which the surface of EL device 41A is entirely covered with optically transparent protective insulating layer 47.

Furthermore, insulating layer 47 is not necessarily cover the entire surface of electrode layer 46 but may cover arbitrary portions. For example, on the upper surface of electrode layer 46 corresponding to individual switch portion 52, insulating layer 47 may not be formed. In this case, when insulating button (not shown) is provided, switching operation is possible. In this configuration, since electrode layer 46 is depressed directly by the button, the lower surface of the button that is brought into contact with electrode layer 46 may be, for example, sphere with a large curvature.

SECOND EMBODIMENT

Figure 10:
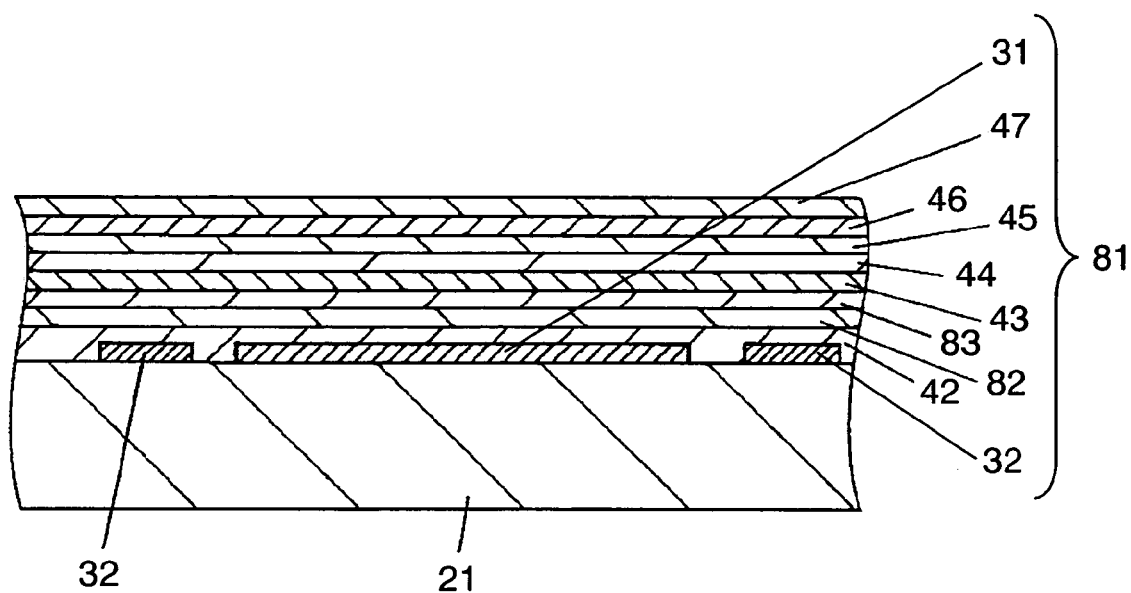
FIG. 10 is a sectional view showing a dispersion-type EL device according to a second embodiment of the present invention.
Figure 11:
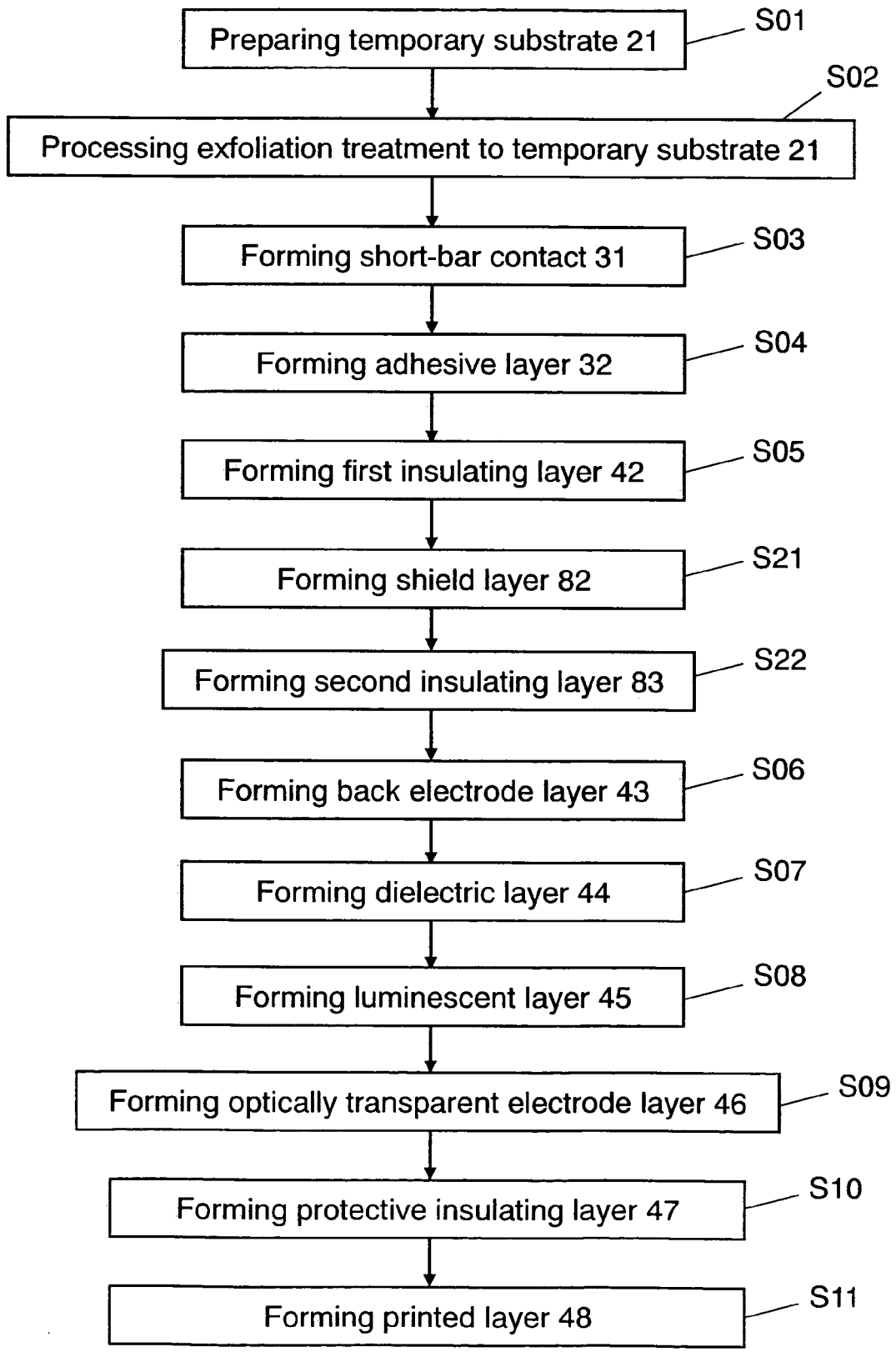
FIG. 11 is a flowchart showing a method for manufacturing the dispersion-type EL device shown in FIG. 10.
Figure 12:
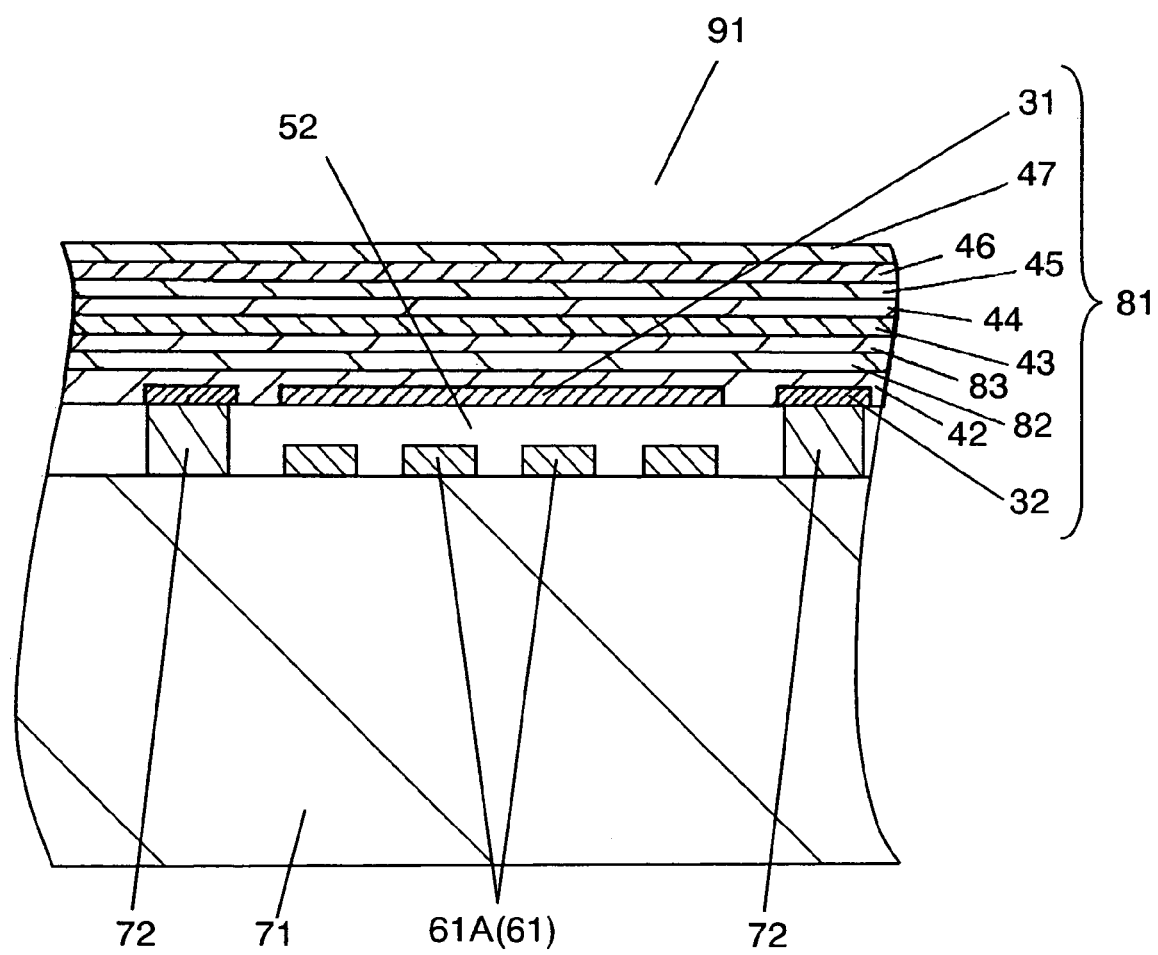
FIG. 12 is a sectional view showing an illuminated switch unit configured by using the dispersion-type EL device shown in FIG. 10.
Figure 13:
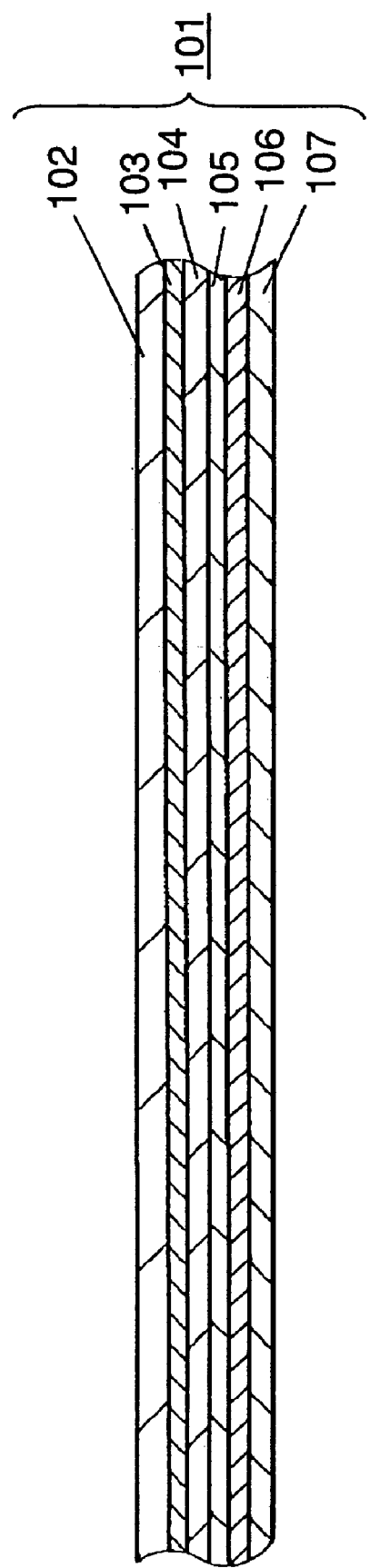
FIG. 13 is a sectional view showing a conventional dispersion-type EL device.
Figure 14:
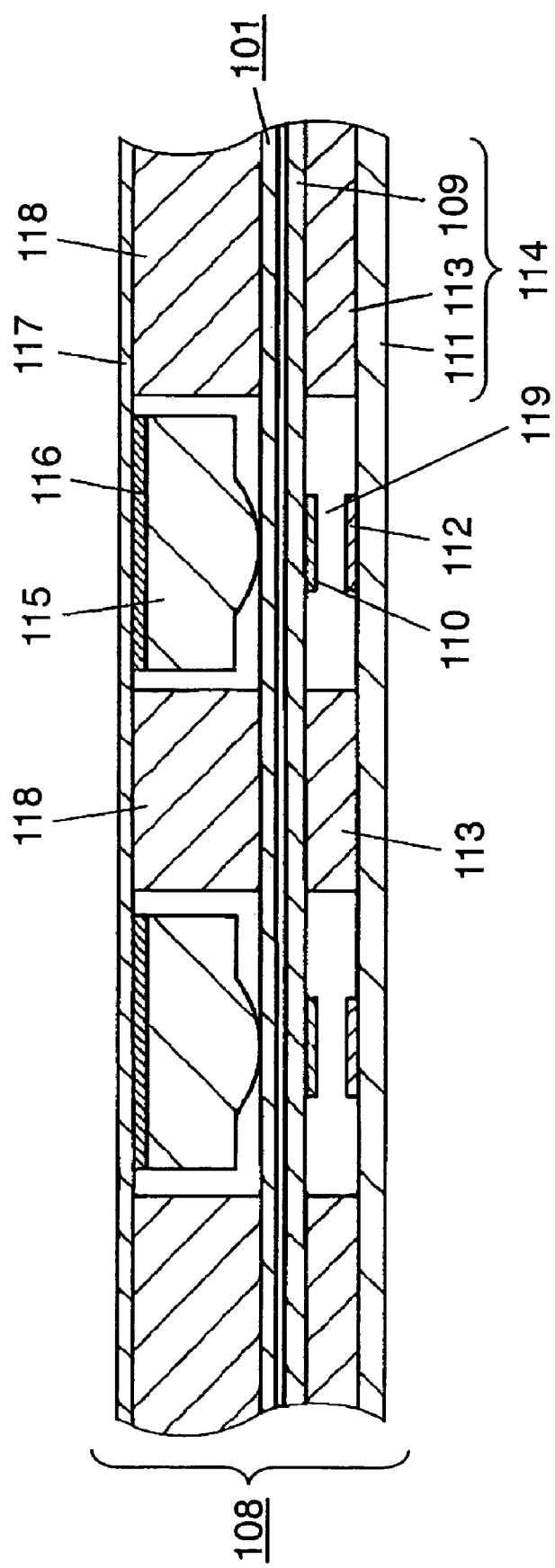
FIG. 14 is a sectional view showing an illuminated switch unit configured by using a conventional dispersion-type EL device.

FIG. 10 is a sectional view showing an EL device according to a second embodiment of the present invention. FIG. 11 is a flowchart showing a method for manufacturing the dispersion-type EL device shown in FIG. 10.

EL device 81 according to the second embodiment has a configuration in which in addition to the configuration of EL device 41 according to the first embodiment, shield layer 82 and second insulating layer 83 (hereinafter referred to as "insulating layer 83") are further printed between insulating layer 42 and back electrode layer 43. The same reference numbers as employed in the first embodiment refer to the same parts, and detailed description thereof is omitted herein. Note here that in the configuration of EL device 81, measures against static electricity are taken.

A method of manufacturing EL device 81 is described with reference to FIG. 11.

First, steps S01 to S05 are the same as those shown in FIG. 3, and in the steps, contact 31, adhesive layer 32 and insulating layer 42 are formed on temporary substrate 21. Subsequently, shield layer 82 is formed over the entire surface of insulating layer 42 by screen printing using highly conductive paste such as silver paste (step S21). Furthermore, by screen printing using an insulating paste, insulating layer 83 is formed over the entire surface of shield layer 82 (step S22). On insulating layer 83, as in FIG. 3, back electrode layer 43, dielectric layer 44, luminescent layer 45, electrode layer 46, insulating layer 47 and printed layer 48 are sequentially formed by screen printing.

Furthermore, EL device 81 is also peeled off from temporary substrate 21 and then attached to wiring board 71 provided with contact 61. Thus, switch unit 91 is configured.

Since one end of shield layer 82 is electrically connected to an earth portion (not shown) of wiring board 71, even when a noise voltage or a surge voltage, for example, static electricity, flows from the side of EL device 81, it is allowed to flow to ground/earth directly. Thus, it is possible to prevent static electricity from leaking to individual switch portion 52, so the reliability of switch unit 91 is improved.

It is further preferable that when shield layer 82 is disposed at the side of switch portion 52 with respect to back electrode layer 43, noise occurring when EL device 81 is driven is also allowed to flow to earth.

It is advantageous that EL device 41 can be made thin because switch unit 51 is configured without including a substrate. On the contrary, since there are little insulating inclusions between EL device 41 and switch portion 52, EL device 41 is susceptible to an effect of static electricity, etc. from the outside. However, since in EL device 81, comprehensive measures against static electricity are taken, individual measures against static electricity with respect to individual switch portions 52 are typically not required. As a result, measures against static electricity can be taken efficiently.

Note here that switching operation of switch unit 91 is also the same as that of switch unit 51, and therefore description thereof is omitted herein. Since shield layer 82 and insulating layer 83 contain a resin component, reinforcement effect of restoring force at the time of switching operation of switch unit 91 can be further improved.

Since switch unit 91 is also configured by using EL device 81 without including a substrate, thin switch unit 91 can be realized easily.

Furthermore, a second luminescent layer (not shown) may be formed by screen printing in EL devices 41 and 81 so that multicolor light can be emitted. Thus, it is possible to configure a thin switch unit having an improved function or property.

Note here that a configuration of EL devices 41 and 81 provided with adhesive layer 32 was described. However, an adhesive layer need not be formed on an EL device. For example, an EL device peeled off from temporary substrate 21 may be attached to wiring board 71 or spacer 72 by using an adhesive member such as double-stick tape.

Similarly, contact 31 need not be integrated into an EL device. For example, when an EL device is connected to wiring board 71, an independent short-bar contact may be inserted.

What is claimed is:

1. A dispersion-type EL device, comprising:
   a substrate;
   a short-bar contact formed on a portion of a surface of the substrate, the surface having improved peeling characteristics;
   an adhesive layer formed on a further portion of the surface of the substrate and positioned around the short-bar contact such that a gap exists between the short-bar contact and the adhesive layer;
   a first insulating layer formed on the short-bar contact;
   a back electrode layer formed on the first insulating layer;
   a dielectric layer formed on the back electrode layer;
   a luminescent layer formed on the dielectric layer; and
   an optically transparent electrode layer formed on the luminescent layer,
   wherein the short-bar contact and the adhesive layer are formed only in the same plane, and
   wherein the short-bar contact and the adhesive layer are peelable from the substrate.

2. The dispersion-type EL device according to claim 1, further comprising:
   a shield layer formed on the first insulating layer; and
   a second insulating layer formed on the shield layer,
   wherein the back electrode layer is formed on the second insulating layer.

3. The dispersion-type EL device according to claim 1, further comprising:
   an optically transparent protecting insulating layer formed on the optically transparent electrode layer.

4. The dispersion-type EL device according to claim 1, further comprising:
   an optically non-transparent printed layer formed on the optically transparent electrode layer.

5. The dispersion-type EL device according to claim 1, wherein the first insulating layer is formed in the gap between the short-bar contact and the adhesive layer.

* * * * *